United States Patent [19]
Bauer et al.

[11] Patent Number: 5,560,122
[45] Date of Patent: Oct. 1, 1996

[54] ONE-POT MIXER/GRANULATOR/DRYER

[75] Inventors: Kurt Bauer, Freiburg; Wolfram Carius, Mittelbiberach; Gerold Duschler, Biberach, all of Germany

[73] Assignee: Dr. Karl Thomae GmbH, Biberach an der Riss, Germany

[21] Appl. No.: 246,031

[22] Filed: May 19, 1994

[30] Foreign Application Priority Data

Jun. 3, 1993 [DE] Germany ............... 43 18 471.5

[51] Int. Cl.$^6$ ................................. F26B 3/34
[52] U.S. Cl. .................... 34/268; 34/68; 34/92; 34/412; 34/426
[58] Field of Search ............... 34/266, 267, 268, 34/68, 92, 418, 426, 403, 408, 412, 578, 269

[56] References Cited

U.S. PATENT DOCUMENTS

| | | | |
|---|---|---|---|
| 1,557,921 | 4/1921 | Buel | 34/266 |
| 2,668,364 | 2/1954 | Colton | 34/92 |
| 3,565,168 | 2/1971 | Powell et al. | |
| 4,698,917 | 10/1987 | Debolini | 34/92 |
| 4,856,203 | 8/1989 | Wennerstrum | 34/92 |
| 4,916,831 | 4/1990 | Yasumura et al. | 34/92 |
| 5,277,245 | 1/1994 | Dutta et al. | 34/578 |

FOREIGN PATENT DOCUMENTS

| | | |
|---|---|---|
| 0151782 | 8/1985 | European Pat. Off. . |
| 0315041 | 5/1989 | European Pat. Off. . |
| 429597 | 7/1967 | Germany . |
| 3128839 | 2/1983 | Germany . |
| 3446424 | 6/1986 | Germany . |
| 4119149 | 11/1992 | Germany . |
| 581040 | 5/1944 | United Kingdom ............ 34/266 |
| 581040 | 9/1946 | United Kingdom . |
| 8912207 | 12/1989 | WIPO . |

*Primary Examiner*—Henry A. Bennett
*Assistant Examiner*—Susanne C. Tinker
*Attorney, Agent, or Firm*—Robert P. Raymond; Alan R. Stempel; Mary-Ellen M. Devlin

[57] ABSTRACT

The invention relates to a one-pot mixer/granulator/dryer constituting a single step or one-pot production apparatus for successively mixing, moist-granulating and drying solid pharmaceutical products, for example in the manufacture of powdered products, pellets or granules. The dryer according to the invention has a substantially improved drying performance compared with conventional production equipment. The high efficiency of drying is achieved by the simultaneous use of four different drying mechanisms. The invention also relates to a process for successively mixing, moist-granulating and drying in the manufacture of solid pharmaceutical products, particularly pharmaceutical granules, in which the necessary mixing operations, moist-granulation and subsequent drying operation are carried out in one container and drying is effected using a combination of contact, vacuum, flushing air and infrared drying with the aid of an electrically heated ceramic infrared panel radiator mounted outside the dryer or an electrically heated quartz tube radiator.

8 Claims, 5 Drawing Sheets

ONE-POT MIXER/GRANULATOR/DRYER

The invention relates to a one-pot mixer/granulator/dryer, hereinafter referred to as a dryer, which is a one-stage or one-pot production apparatus for successively mixing, moist-granulating and drying solid pharmaceutical products, eg. in the manufacture of powdered products, pellets or granules. In this one-pot production apparatus the individual steps of moist granulation, eg. the mixing, moistening and kneading as well as the drying, can be carried out in one step and without any change of apparatus or transfer of materials. The dryer according to the invention has a much better drying performance than conventional production equipment. Since the drying performance of the known apparatus of this kind which have been conventionally used hitherto is unsatisfactory, which contributed to their failure to penetrate the market on any large scale, the drying performance, in particular, of the dryer according to the invention was substantially improved by combining a number of specific drying methods. The great effectiveness of drying is achieved by the simultaneous use of four different drying mechanisms.

The invention further relates to a process for successively mixing, moist-granulating and drying solid pharmaceutical products, eg. in the manufacture of powdered products, pellets or granules, in which the necessary mixing operations, moist-granulation and the subsequent drying process are carried out in one container and drying is performed using a combination of contact, vacuum, flushing air and infrared drying by means of an electrically heated infrared panel radiator mounted above the dryer or an electrically heated quartz tube radiator.

Conventional production apparatus for producing pharmaceutical granules, which operate with combinations of contact and vacuum drying with microwave or flushing air drying or wherein infrared drying is used, have a number of crucial disadvantages.

When microwave energy is used, it is not permissible to go below a certain minimum pressure (80–100 mbar), since otherwise the risk of voltage arcs with consequent burning of the material being dried increases to a vast degree (A. C. Metaxas, R. J. Meredith, Industrial Microwave Heating, London 1983, p. 259ff). During infrared drying, on the other hand, substantially lower pressures can be used.

The electrical field resulting from the irradiation of microwaves in the drying container can neither be calculated nor controlled. Under unfavourable conditions, when reflections are superimposed on unmoving or immovable points of the layer of material, for example when material is caked onto the inner wall of the container, there may be critical compressions of field lines resulting in local overheating (hot spots) and burning of the material. By contrast this risk does not generally arise when infrared radiation is used.

German Offenlegungsschrift DE 34 46 424-A1 describes a heat radiating dryer for drying off pharmaceutical products. The apparatus consists of a rotatable container for receiving the material to be dried and has heat radiators in the form of infrared heating lamps arranged inside the container. In addition, the container can be evacuated by means of a vacuum suction connector. The direct irradiation of the material which occurs in this case must be expected to lead not only to an impairment of the quality of the material as a result of the dust particles burnt on the surface of the radiation lamps but also to an undesirable effect on the emission characteristics caused by adhering particles and to a reduction in the service life of the radiator.

Since the radiation-emitting surface of infrared heating lamps is very small, no great quantities of energy are transmitted. Moreover, the emission spectrum of these lamps cannot be adequately matched to the absorption curve of the solvent, generally water, which is to be dried off.

The aim of the present invention is to provide a one-stage or one-pot production apparatus for successively mixing, moist-granulating and drying solid pharmaceutical products, particularly in the manufacture of pharmaceutical granules, in which the disadvantages described hereinbefore connected with the use of microwave energy or infrared radiation in conventional apparatus are overcome, and by means of which a fast, effective and gentle, as well as cheap, drying of pharmaceutical solids is achieved with the simplest possible apparatus.

The invention may be understood by reference to the drawings, which may be briefly described as follows.

The comparison of curves A and B shows that the placebo granules are dried more quickly using infrared radiation.

The comparison of curves B and C shows that a lower residual moisture can be achieved using the infrared drying component even in spite of a substantially lower flushing air temperature.

The comparison shows that the method of the invention provides significantly shorter drying times than the other methods, even when lower pressure is applied in the processes using microwave radiation.

This objective is achieved by means of a combination of four different drying components in the dryer according to the invention, consisting of contact, vacuum, flushing air and infrared drying, the infrared drying component consisting of an electrically heated infrared panel radiator or quartz tube radiator (1) mounted outside the dryer, which irradiates its energy onto the drying material contained inside, through a window (2) built into the wall of the dryer, this window being sufficiently permeable to infrared radiation. Electrically heated ceramic infrared panel radiators and electrically heated quartz tube radiators (1), eg. standard commercial radiators of the Elstein T-FSR 1000®, T-HTS 800® type or a short wave or medium wave Heraeus standard radiator are preferred.

The dryer according to the invention consists of a closeable receiving container (12) which can be pivoted to the left and right about a pivot axis (17), and a container lid (11) with heatable vessel walls for forming a moving bed of material for drying, wherein the mixing of the material to be dried can additionally be promoted by a rotatable mixing arm suitably mounted inside the container (12), consisting of the mixing arm shaft (15) with mixing arm vanes (13) mounted thereon. Preferably, the dryer can be pivoted to the left and right about the pivot axis (17) up to an angle of 90°. The dryer is also adapted to be evacuated through a vacuum connection (9) which simultaneously serves as an outlet for the flushing air, and the dryer additionally has an inlet (14) for the flushing air leading into the interior of the dryer, the flushing air inlet (14) preferably being mounted on the underside of the receiving container (12) whilst the vacuum connection (9) is arranged opposite on the upper side of the container lid (11). Moreover, outside the dryer is mounted an electrically heated infrared panel radiator or an electrically heated quartz tube radiator (1) which irradiates its energy onto the material for drying contained inside, through a window (2) mounted in the wall of the dryer and sufficiently permeable for infrared radiation. Preferably, the window (2) is integrated in the wall of the container lid (11).

The first two drying components carried out in the dryer according to the invention consist of contact drying by the introduction of heat through the heatable vessel walls of the dryer and vacuum drying ie. lowering the boiling point of the solvent to be dried by the application of vacuum, and are generally widely used even in conventional dryers and may be regarded as standard in one-pot apparatus. By heat contact with the vessel walls of the dryer, heatable by means of a suitable heating medium such as hot water or steam, eg. via heating circuits integrated in the vessel walls, the material is heated by the transfer of heat. It is possible, for example, to use a heating medium with a temperature between 50° and 80° C. However, a heating medium with a temperature of 60° C. is preferably used. If vacuum is applied through a vacuum connector (9) mounted on the dryer, as a result of the lowering of the boiling point less energy is needed to evaporate the solvent and at the same time the drying operation is made gentler. Admittedly, in a vacuum, the transfer of heat from the walls to the material is substantially less efficient than under normal pressure and as a result the utilisation of the heat supplied is reduced. For example, a vacuum with a pressure of between 10 and 200 mbar is applied. However, a pressure of between 130 and 175 mbar is preferred. The pressures specified refer to the constant final pressure achieved with simultaneous activation of all four drying components in the dryer according to the invention.

The third drying component, namely drying with flushing air, is based on a mechanism of convection. With the aid of the underpressure applied to the dryer through the vacuum connector (9), a small but definite current of dry purified and heated air is passed through the flushing air inlet (14) mounted on the underside of the container and into the layer of product from below and is sucked through all the material to be dried. The flushing air inlet (14) consists, for example, of a semi-permeable porous membrane or is present in the form of suitable porous sintered metal inserts which are removable and easy to clean. The flushing air is supplied, for example, by applying compressed air to the flushing air inlet (14) via a compressed air inlet line (20) at a pressure of 4 to 8 bar and at a temperature between 100° and 250° C., the flushing air entering the interior of the dryer, as the pressure is released, through the flushing air inlet (14) at a flow rate of between 10000 and 50000 l/h, for example, preferably, compressed air is used at a pressure of 6 bar and a temperature of 230° C. and a flow rate of between 16000 and 18000 l/h is achieved with an internal volume of the sealed container (12) of 50 liters. The compressed air is preferably delivered through a flushing air inlet line (16), through a hollow drilled mixing arm shaft (15) suitably mounted in the receiving container (12), to a flushing air inlet (14) integrally formed in the mixing arm vane (13). In front of the flushing air inlet line (16) is provided a suitable flow meter (23) with regulator valve for monitoring and regulating the flow rate of the flushing air as well as a suitable heating apparatus (24) with air temperature sensor (26) connected behind it for heating up the flushing air. The flushing air (strip gas) passing through the layer of product is partially saturated with the evaporating solvent and acts as a vehicle for improved and faster removable of the vapours. The dry flushing air causes a sharp vapour pressure gradient relative to the material being dried, thereby leading to an increase in the drying effect. Depending on the suction capacity of the vacuum pumps used, the volume of flushing air can be increased to an optimum level to achieve a faster drying rate.

Critically important to the present invention is the combination of the three above-mentioned drying components, which were already known in combination, with an infrared drying component consisting of an electrically heated infrared panel radiator of quartz pipe radiator (1) mounted on the outside of the dryer and irradiating its energy onto the material for drying contained inside through a suitable window (2). The radiator (1) is provided with a suitable supply of current and control means.

According to the invention, the interaction of these four drying components substantially increases the speed of drying of solid pharmaceutical products under gentle conditions compared with conventional dryers and in particular achieves a significantly lower content of residual moisture of residual content in the material dried. The use of electrically heated infrared panel radiators or electrically heated quartz tube radiators according to the invention is extremely cheap compared with the use of expensive microwave technology.

Since the drying process necessarily leads to substantial dust formation, it is out of the question to mount the infrared radiator inside the dryer for pharmaceutical reasons. Dust particles burn on the surface of the ceramic panel radiator, which is at a temperature of nearly 700° C., or the quartz tube radiator, which is at a temperature of nearly 300° C., and get into the product as impurities.

The fact that the radiation in the centre of the container meets a surface of material which is constantly being mixed ensures that the radiation absorbed is subjected to adequate heat exchange between the particles of material and no unmoving areas are irradiated. Any caked-on material is unimportant as it is not in the irradiation zone. The permanent yet gentle mixing of the material is made possible, on the one hand, by the pivoting of the drying container through an angle of up to 90° to the left and right about a pivot axis (17) and also by the mixing arm which slowly rotates at intervals. For example, the mixing arm may be set rotating at intervals of 60 seconds at a speed of 4 to 10 rpm for 6 seconds at a time.

Of the variety of infrared radiators, surprisingly, the above-mentioned electrically heated ceramic panel radiators and the electrically heated quartz tube radiators are particularly suitable for solving the problem of the present invention. The electrically heated ceramic panel radiator which belongs to the dark radiators emits the majority of its energy in the same wavelength range in which water has its absorption peak.

The radiation characteristics of a ceramic infrared panel radiator, for example, can be controlled to precisely ±1° C. by means of a thermocouple-controlled temperature regulating device. Since the emission characteristics of the radiator are correlated with this surface temperature, a certain emission spectrum with a corresponding wavelength peak can be produced deliberately. Appropriately, the wavelength peak of the radiator is matched to a suitable absorption peak of the solvent which is to be dried out. In experiments, a wavelength peak of the radiator in the range from 2.5 to 6 μm has proved suitable for drying out water as solvent. A wavelength peak of 3 μm, corresponding to a surface temperature of 690° C., is particularly suitable.

The radiator will withstand high mechanical and thermal loads and has a very long service life. Since the radiation emitting surface is large, relatively large amounts of energy can be transmitted. Other infrared radiators, particularly bright radiators of the incandescent lamp construction, do not have all the required properties and are not suitable for the purpose described.

In order to avoid scatter losses, the radiator (1) may be provided with reflectors of smooth-rolled aluminium or silver or gold applied to a carrier material by vaporising or provided in a correspondingly thin layer. Between the radiator (1) and the window (2), if ceramic panel radiators are used, a reflective shutter (3) with pivot mechanism is conveniently arranged so that when the reflective shutter (3) is closed the working temperature is reached more quickly or can be maintained with only a limited energy supply with brief interruptions. Moreover, this prevents the radiation being absorbed by the window (2) in the wavelength ranges which it passes through when heated up and cooled down, and avoids the window being heated unnecessarily.

The window (2) between the radiator (1) and the material to be dried is vacuum-tight and can be subjected to strong thermal and mechanical loads and has suitable transmission characteristics for infrared radiation in the operating range of the radiator emission. It is preferable to use windows having a transmittance of more than 60% at the wavelength peaks of the infrared radiation applied under the operating conditions. It is particularly preferred to use windows having a transmittance of more than 80%. Windows with transmittance levels of less than 60% are unsuitable. Windows which are ideally suited preferably consist of quartz having a low OH content.

In order to remove the radiant heat absorbed by the window (2), the surface of the window (2) is preferably cooled by an air current, eg. a current produced by a cooling fan (4) or suction ventilator. The cooling fan (4) is preferably arranged, where a ceramic panel radiator is used, in such a way that the jet of air only passes over the window (2) and does not touch the surface of the radiator.

It is advisable to keep the surface of the window which faces the material for drying free from impurities by means of suitable intermittent air jet flushing (5) so that the radiation can reach the material unimpeded and the function of the window (2) is maintained without affecting the vacuum.

Only a combination of all four drying mechanisms and equipment as described hereinbefore guarantees the desired course of events and the operation of the drying process to produce an end product of the desired quality.

The second object of the invention is a process for successively mixing, moist-granulating and drying solid pharmaceutical products, eg. in the manufacture of powdered products, pellet or granules, in which the mixing process is required, the moist granulation and the subsequent drying process are carried out in a dryer which can be closed off in air tight manner, consisting of a container (12) and container lid (11), and for the drying operation a combination of contact, vacuum, flushing air and infrared drying corresponding to the dryer described hereinbefore is used, whilst with the aid of an electrically heated infrared panel radiator or electrically heated quartz tube radiator (1) mounted outside the dryer, infrared radiation having a wavelength peak matched to the absorption characteristics of the solvent to be dried out is directed onto the material located inside the container through a suitable window (2) integrated in the wall of the dryer and the window (2) has a transmittance of more than 60% at the wavelength peak irradiated. It is preferable to use an electrically heated ceramic infrared panel radiator or an electrically heated quartz tube radiator (1). The name VAKIR process (VAkuum, Kontact, InfraRot) with integrated flushing air drying is proposed for the process described.

Preferably, the window (2) is integrated in air tight manner in the container lid (11) and has a transmittance of more than 80% at the wavelength peak irradiated. In order to dry out water, infrared radiation having a wavelength peak in the range from 1.2 to 6 μm is conveniently used, but more especially a wavelength peak of 1.2 μm.

The process according to the invention is further characterised in that the a) the contact drying is carried out by the introduction of heat through heating circuits integrated in the walls of the container (12) and/or in the container lid (11), the heating medium having a temperature between 50° and 80° C., b) the vacuum drying being carried out by lowering the boiling point of the solvent which is to be dried out, using underpressure, a constant pressure of between 10 and 200 mbar being established inside the sealed container (12) by means of a vacuum connector (9) mounted on the container (12) or container lid (11), and c) the flushing air drying being carried out by passing a defined current of dry, cleansed and heated air throughout the material which is to be dried, the flushing air being introduced into the bed of material for drying by means of the underpressure prevailing inside the sealed container (12), via a flushing air inlet (14) mounted on the underside of the container (12) with a suitable supply of flushing air at a through flow rate of 10000 to 50000 l/h, this flushing air leaving the container (12) through the vacuum connection (9).

Preferably, the heating medium used for the contact drying is hot water or water vapour at a temperature of 60° C. A constant pressure of between 130 and 175 mbar is preferably generated for the vacuum drying by means of a vacuum connector (9) mounted on the container lid (11) inside the sealed container (12). During the flushing air drying, with an internal dryer capacity of 50 liters, a through flow rate of flushing air of between 16000 and 18000 l/h is preferably chosen, whilst, for the supply of flushing air, preferably dry, cleansed and heated compressed air is passed through a flushing air feed line (16) through a hollow drilled mixer arm shaft (15) suitably mounted in the container (12) and the mixing arm vane (13) attached thereto and provided with an inner cavity, to a flushing air inlet (14) integrated in the mixing arm vane (13) the compressed air having a pressure of 4 to 8 bar and a temperature of between 100° and 250° C. It is particularly preferred for the compressed air to be at a pressure of 6 bar and a temperature of 230° C. The through flow rate of the flushing air can be controlled and regulated by means of a flow meter (23) with regulator valve mounted in front of the flushing air feed line (16).

The container (12) is conveniently pivoted slowly to the left and right alternately about a pivot axis (17) during the drying process in order to form an inherently moving bed of material for drying, whilst the mixing of the material may additionally be promoted by a mixer arm slowly rotating at intervals inside the container (12). The container (12) is pivoted to the left and right, preferably through up to 90°, about the pivot axis 17, whilst the mixing arm may additionally be rotated, for example, at intervals of 60 seconds at a speed of 4 to 10 rpm for 6 seconds at a time.

The following embodiments by way of example serve to illustrate the invention, with reference to the representations in FIGS. I to V but should not constitute a restriction of the invention to any specific embodiments.

EXAMPLE 1

Figure 1:
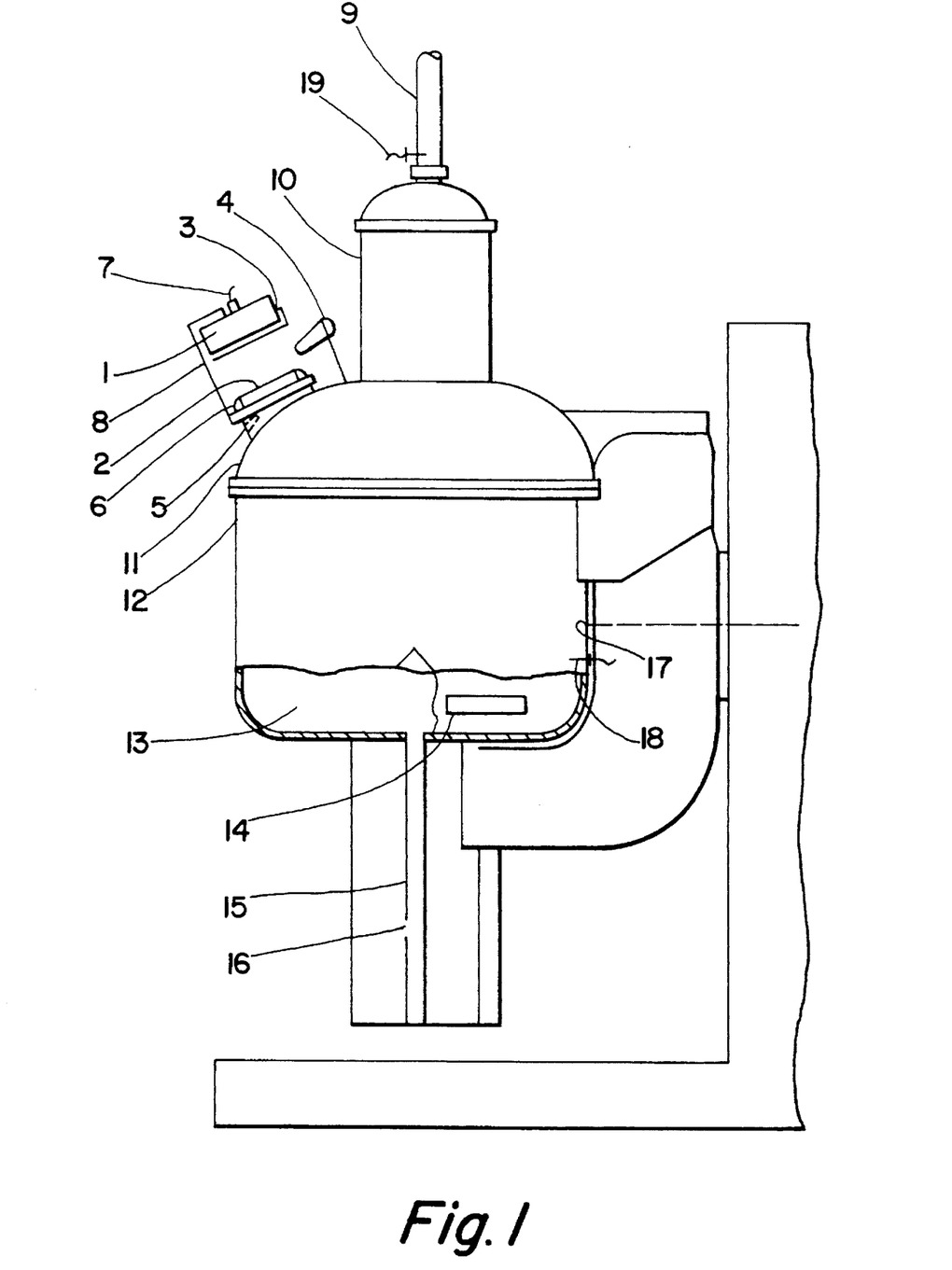
FIG. 1 shows a schematically cross-sectional side view of a one-pot mixer/granulator/dryer according to the invention.

FIG. I shows a diagrammatic cross-sectional side view of a dryer according to the invention:

The dryer consists of a heatable and coolable container (12) and an equally heatable and coolable container lid (11) which forms an air tight seal, the heating or cooling being made possible by hot or cold water circuits integrated in the walls, and is mounted at one end so as to be pivotable to the left and right about a pivot axis (17) to angles of up to 90°, in order to allow free mixing of the material in the container. Placed on the lid of the container (11) is a heatable filter dome (10) which has a vacuum connection (9) with exhaust air temperature sensor (19). The filter dome (10) contains a product dust filter which can be rinsed back. The flushing air is supplied from underneath the container (12) through the hollow drilled rotatable mixing arm shaft (15), reference numeral (16) designating the flushing air feed line into the mixing arm shaft (15). The inner cavity of the mixing arm shaft (15) is connected to a flushing air inlet (14) leading into the interior of the container (12). The flushing air inlet (14) may consist of a porous semi-permeable membrane or porous sintered metal inserts and is integrated in the mixing arm vane (13) attached to the mixing arm shaft (15).

A window (2) which is pervious to infrared is mounted in air tight manner in the container lid (11) by means of a socket with mounting frame (6). Inside the socket is mounted a nozzle for intermittent air jet flushing (5), this nozzle being directed onto the window (2) and connected to a suitable air supply, the flushing device (5) being adapted to blow any impurities away from the window (2) at predetermined intervals.

Above the window (2), an electrically heated ceramic infrared panel radiator (1) of the Elstein T-FSR 1000® type is mounted by means of the radiator mounting (8).

The radiator (1) has a reflector housing and is equipped with a reflective shutter (3) with pivot mechanism. Reference numeral (7) denotes the connector for the current supply and for controlling the radiator (1). The surface of the window (2) facing the radiator (1) can be cooled by means of a cooling fan (4).

Inside the container (12) is mounted a temperature sensor (18) for determining the temperature of the material to be dried. The material for drying may be powdered, granular or shaped and may, for example, take the form of granules, powder or pellets.

Figure 2:
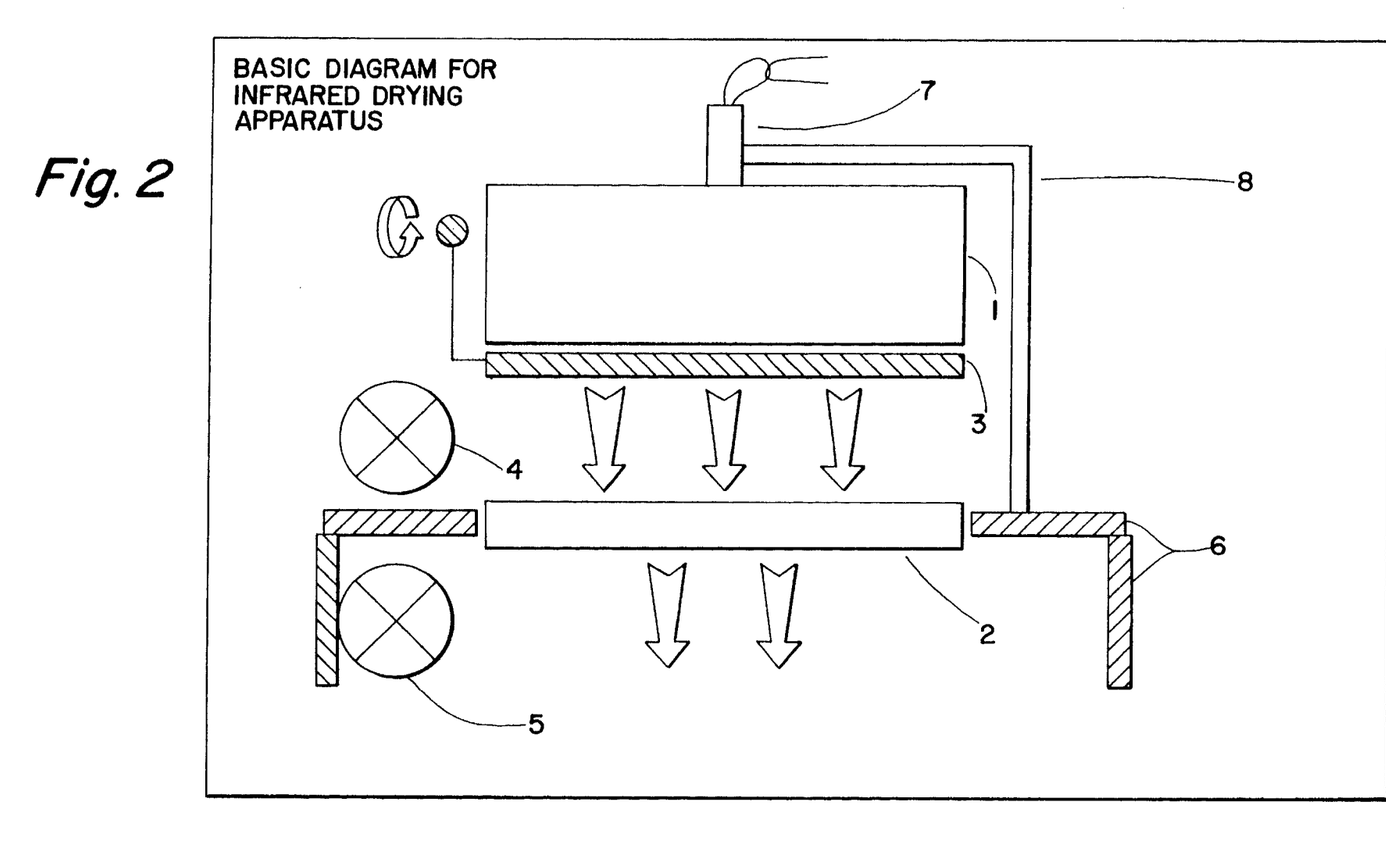
FIG. 2 shows in form of a basic diagram only the infrared drying component mounted above window (2) which is integrated in the container lid (11). Emitted radiation is symbolized by arrows.

FIG. II shows the infrared drying apparatus in the form of a basic diagram:

The ceramic infrared panel radiator (1) with reflector housing, fixed to a radiator mounting (8), is directed towards the infrared-permeable window (2) mounted in the socket with mounting frame (6) and is provided with a reflective shutter (3) having a pivot mechanism. The direction of radiation is indicated by arrows. The surface of the window (2) facing the radiator (1) is cooled by means of the cooling fan (4). The window (2) can be kept free of impurities by means of a nozzle for intermittent air jet flushing (5), which is directed towards the side of the window (2) facing into the interior of the dryer. Reference numeral (7) designates the connector for the current supply and controls of the radiator (1).

Figure 3:
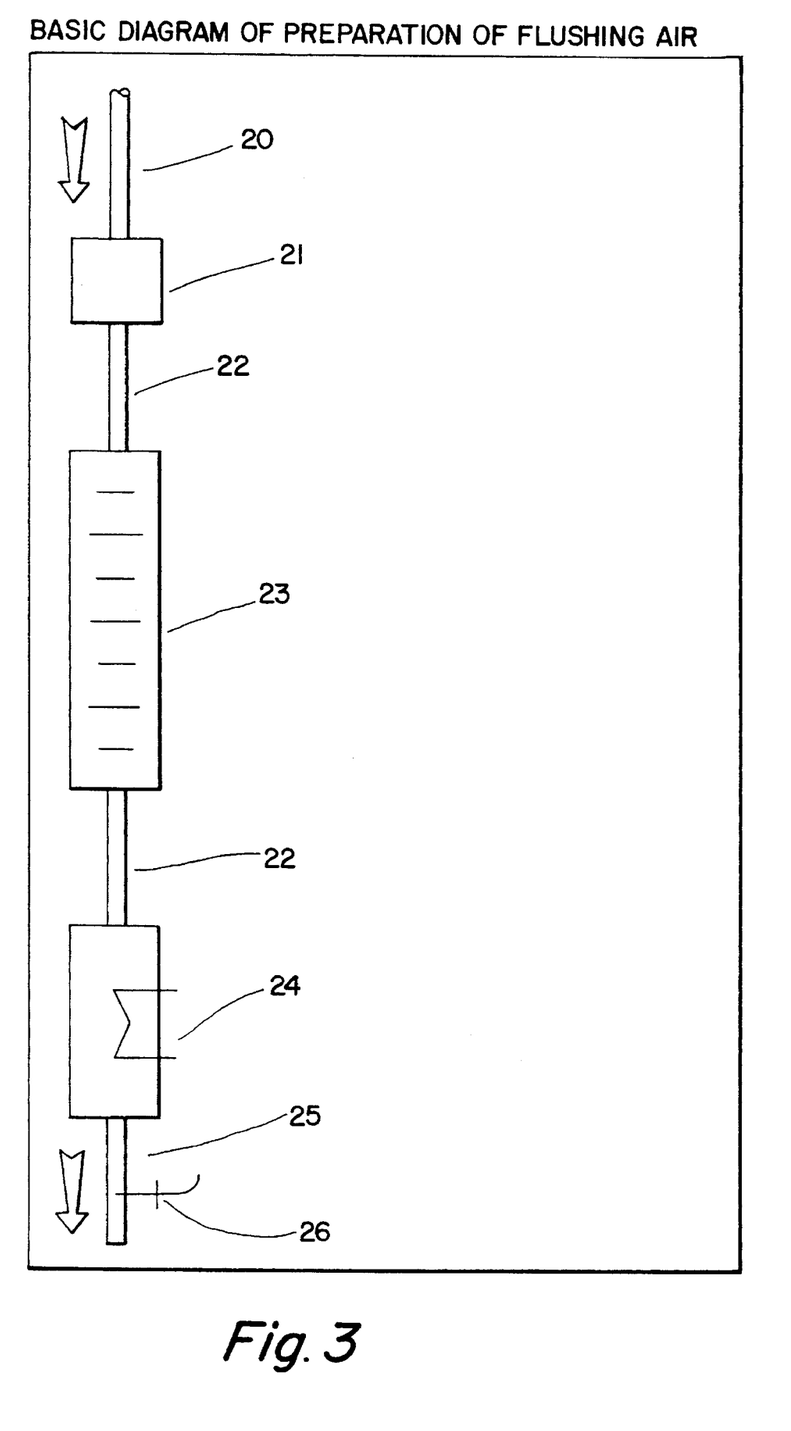
FIG. 3 shows a basic diagram of the flushing air preparation by means of pressure reducer (21), flow meter (23) with regulator valve and heating device (24), integrated in the air feed line (22). The air flow direction is symbolized by arrows.

FIG. III is a basic diagram of the flushing air preparation:

Attached to the compressed air feed line (22) with pressure reducer (21) by means of connecting lines (22) are a flow meter (23) with regulator valve and a heating device (24). Reference numeral (25) denotes the thermally insulated feed line (25) connected to the flushing air feed line (16), an air temperature sensor (26) being integrated in said line (25).

EXAMPLE 2

The drying process will be explained with reference to the production of Placebo-Granules. The granules have the following composition based on the dry mass:

| | |
|---|---|
| Lactose monohydrate | 60.0% |
| Dried corn starch | 32.% |
| Highly dispersed silica | 3.2% |
| Soluble corn starch | 4.5% |
| Magnesium stearate | 0.3% |
| Purified water | 25.5% (volatile ingredient) |

The granulating liquid consists of the water and the soluble corn starch. The magnesium stearate is not added until just before the dried granules are compressed. After the mixing and granulating process has ended the substance is present in the form of individual particles of granulate and loose clumps of particles. The latter generally fall apart during the drying process during the first 15–20 minutes. This is caused particularly by the constant automatic mixing of the material caused by the pivoting movement about the pivot axis (17) of the container. At most, two complete pivoting cycles are completed per minute. Based on the vertical starting position of the container, a pivoting range of up to a maximum of 90° to each side is possible and reasonable. The automatic mixing caused by the pivoting has numerous advantages. In addition to thorough and gentle mixing, the distribution of the material for drying over a larger heat exchange surface on the inner wall of the container, caused by the pivoting action, promotes heat exchange. Moreover, as a result of the speed of the mixing arm, reduced to a maximum of 10 rpm, and the intermittent operation thereof, the abrasion of the granulated particles is greatly reduced and destruction of the granules can be avoided. At the same time as the pivot action is preceding, drying is started. All the drying components are activated simultaneously.

The temperature of the container casing is controlled by means of the temperature of the heating medium and is 60° C.

The level of the vacuum applied depends on the one hand on the suction performance of the vacuum pump and on the other hand on the through flow rate of the flushing air. At a through flow of 15900 l/h, a pressure of 160 mbar prevails inside the container (internal volume 50 liters). The temperature of the flushing gas is 230° C.

The working temperature of the infrared radiator is adjusted by means of a thermocouple-control to the desired wavelength peak of the radiation emitted and is 690° C., corresponding to 3 µm. This corresponds to a power uptake of the radiator of 0.8 kW.

Figure 4:
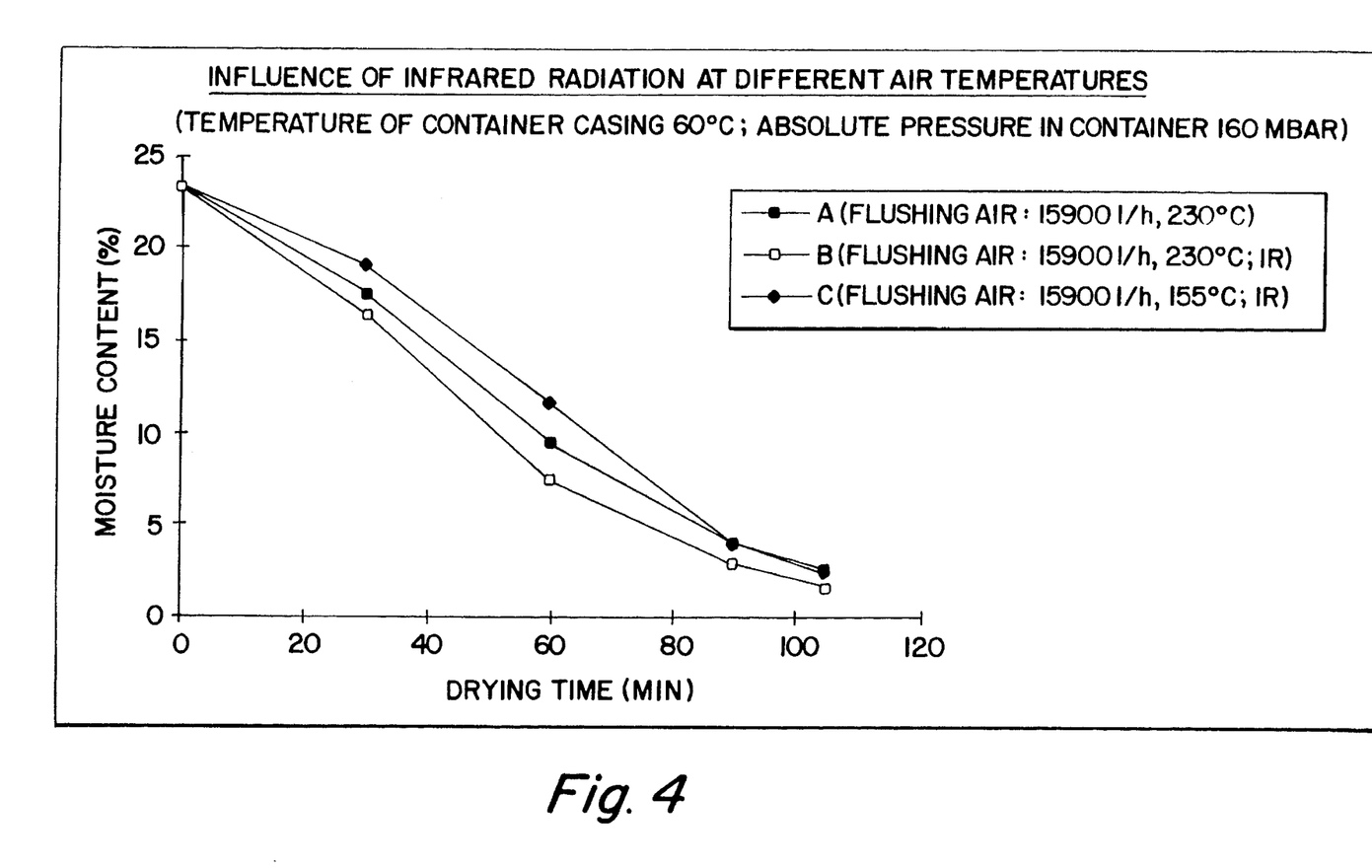
FIG. 4 shows in comparison 3 drying processes (moisture content dependent from drying time) of placebo granules using different drying conditions. Curve A refers to a drying process using a combination of contact vacuum and flushing air drying whereas curve B refers to a process using in addition infrared drying. Curve C refers to a drying process using the same drying components as in the process represented by curve B but with substantially lower temperature of the flushing air (155° C. instead of 230° C.).

The comparison of curves A and B in FIG. IV shows that, with the drying conditions otherwise identical, a Placebo recipe can be dried more quickly using infrared radiation. The moisture level in curve B, which corresponds to drying according to the invention, is lower than with the reference curve A, with no infrared drying component, throughout the entire drying process.

The effect of the infrared radiation in the final drying section after about 90 minutes drying is surprising. As can be seen from FIG. IV, in test C, using the infrared drying component according to the invention it is possible to achieve a lower residual moisture content in the material, in spite of a substantially lower flushing air temperature of 155° C., than in the reference test A with a flushing air temperature of 230° C. but no infrared drying component. The drying power of the infrared radiation is caused by its relatively high depth of penetration into the particles and material during the final drying section, whereas the flushing air at this stage is travelling past surfaces of particles which are substantially dry and can only make a minor contribution to the drying process. With the combination of contact, vacuum, flushing air and infrared drying according to the invention, residual moisture contents of less than 2.0% can be achieved with this recipe.

Figure 5:
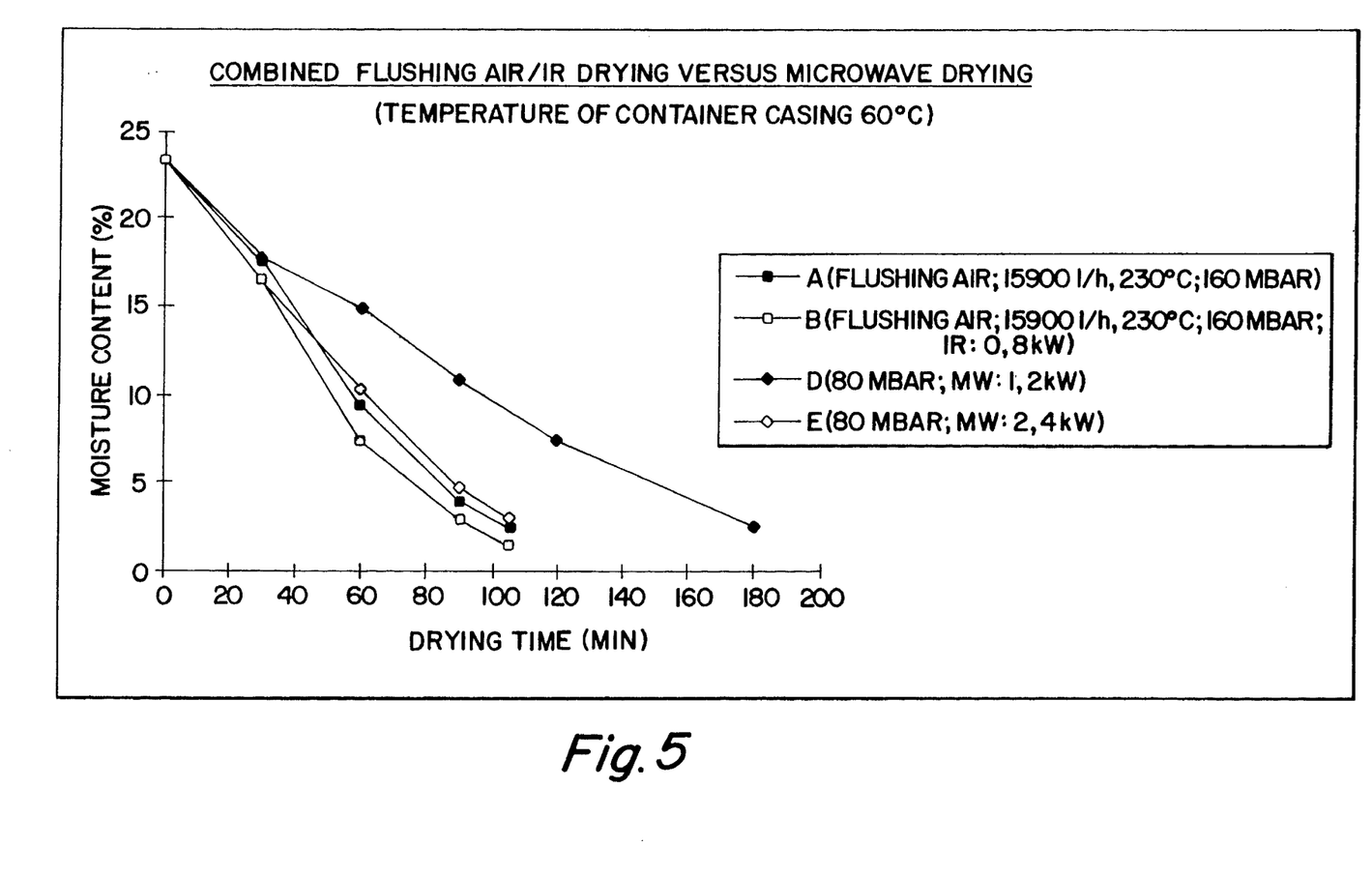
FIG. 5 shows in comparison 4 drying processes (moisture content dependent from drying time) using a combination of contact, vacuum and flushing air drying, a combination according to the invention (curve B), and a combination of contact, vacuum and microwave drying (curves D and E, microwave power output is different).

A comparison of the drying method according to the invention (curve B) with a combination of contact, vacuum and microwave drying (curves D and E) as well as contact, vacuum and flushing air drying (curve A), shown in FIG. V has significantly shorter drying times for the flushing air methods (curves A and B). Even when the pressure of 80 mbar is halved compared with curve B (irradiated infrared output: 0.8 kW) a drying pattern approximately comparable with curve B can only be achieved with a higher microwave power of 2.4 kW in curve E. The drying in the case of the lower microwave output of 1.2 kW chosen for curve D results in a significantly longer drying time.

Legend to FIG. I and FIG. II

1 Infrared radiator with reflector housing
2 Infrared-pervious window
3 Reflective shutter with pivot mechanism
4 Cooling fan
5 Nozzle for intermittent air jet flushing
6 Socket with mounting frame
7 Connector for current supply and control
8 Radiator mounting
9 Vacuum connection (flushing air outlet)
10 Filter dome (heatable)
11 Container lid (heatable)
12 Container (heatable)
13 Mixing arm paddle with inner cavity
14 Flushing air inlet
15 Hollow drilled mixer arm shaft
16 Flushing air feed line
17 Pivot axis
18 Material temperature sensor
19 Exhaust air temperature sensor Legend to FIG. III 20 Compressed air feed line
21 Pressure reducer
22 Connecting lines
23 Flow meter with regulator valve
24 Heating device
25 Thermally insulated feed line for supplying flushing air (16)
26 Air temperature sensor

What is claimed is:

1. An apparatus for successively mixing, moist granulating and drying a material, said apparatus comprising a sealable vessel comprising a receiving container (12), having a top and a bottom, and container lid (11), having a top and a bottom, the receiving container and container lid each having walls defined by inner and outer surfaces, the inner surfaces of the walls defining the interior of said vessel, said vessel being heatable by heating means integrated in the walls of the container (12) and the walls of the container lid (11), said vessel being mounted so as to be pivotable through up to 90° about a pivot axis (17), whereby movement of the vessel about the axis serves to form a moving bed of the material placed within the vessel for drying, a rotary mixing arm mounted inside the vessel, for promoting the mixing of material placed within the vessel, said rotary mixing arm consisting of a hollow drilled mixing arm shaft (15) with mixing arm paddles (13) provided thereon, a flushing air inlet (14), for introducing a stream of air into the interior of the receiving container near its bottom, said inlet including means for filtering said stream of air which filtering means is selected from the group consisting of (a) a semi-permeable, porous membrane and (b) a porous sintered metal insert, a vacuum connection (9), extending through the wall of the lid, from the outer surface to the inner surface, located substantially opposite to the flushing air inlet, to which connection a vacuum is applied, a window (2), integrated in the wall of the container lid (11), which is substantially pervious to infrared radiation, for permitting infrared radiation to pass from the outside of the vessel to the inside of the vessel, an infrared radiator (1) for irradiating infrared energy, having an emmission spectrum with an adjustable peak wavelength, through the window (2) onto the material placed within the vessel, said infrared radiator being mounted outside said container lid and being provided with reflectors selected from the group consisting of smooth-rolled aluminium, silver and gold provided in a thin layer to a carrier material, whilst said radiator (1) is selected from
(a) an electrically heated ceramic infrared panel radiator provided with a reflector shutter (3) with pivot mechanism mounted between the electrically heated ceramic infrared panel radiator and the window (2) and
(b) an electrically heated quartz tube radiator, means for generating an air current for cooling the surface of the window (2) facing the radiator (1) selected from a cooling fan (4) and a suction ventilator, and a suitable intermittent air jet flushing device (5) for keeping the surface of the window (2) facing the material to be dried free of impurities.

2. An apparatus according to claim 1, wherein the window (2) has a transmittance of more than 60% at the wavelength peak of the emmission spectrum irradiated by radiator (1) under the operating conditions.

3. An apparatus according to claim 1, wherein the flushing air inlet (14) is integrated in the mixing arm paddle (13) of the rotary mixing arm with hollow drilled mixing arm shaft (15).

4. A process for successively mixing, moist-granulating and drying a material, wherein solvent-containing material to be mixed, granulated and dried is placed within the vessel of an apparatus according to claim 1, 2, or 3, the material is mixed and granulated through movement of the vessel about the axis (17) and movement of the rotary mixing arm, and the material is dried by means of:

(a) contact heating of the material, which occurs through heating of the walls of the container and container lid by the integrated heating means, (b) flushing of air through the vessel, by means of air introduced through the flushing air inlet, (c) the creation of a vacuum, by means of the withdrawal of gas and solvent from the vessel by means of the vacuum connection, and (d) the irradiation of the material contained within the vessel with infrared radiation, by means of the infrared radiator.

5. The process according to claim 4, wherein the window (2) of the apparatus has a transmittance of more than 80% at the wavelength peak used for irradiation and is integrated in air tight manner in the container lid (11).

6. The process according to one of claim 4, wherein the wavelength peak is in the range from 1.2 to 6 μm and the solvent to be dried out is water.

7. The process according to claim 4, wherein a) the contact drying is effected heating the walls of the container and container lid to a temperature between 50° and 80° C., b) the vacuum drying is effected by lowering the boiling point of the solvent which is to be dried off by lowering the pressure with the container to between 10 and 200 mbar, through withdrawal of air and solvent by means of the vacuum connection, and c) the flushing air drying is carried out by passing a current of dry, cleansed and heated air through the material within the container, the flushing air being introduced by means of the underpressure prevailing inside the container (12), through the flushing air inlet (14) mounted on the underside of the container (12) with a suitable supply of flushing air at a flow rate of 10000 to 50000 l/h, this flushing air leaving the container (12) through the vacuum connection (9).

8. The process according to claim 7, wherein the vessel is slowly pivoted about the pivot axis (17) in order to form a moving bed of material for drying, whilst the mixing operation is additionally promoted by means of the mixing arm slowly rotating at intervals inside the container (12).

* * * * *